April 16, 1957 S. G. EDWARDS 2,788,595
PERPETUAL CALENDAR DEVICE
Filed Nov. 30, 1955 3 Sheets-Sheet 1

INVENTOR.
SIDNEY G. EDWARDS
BY
ATTORNEYS

April 16, 1957     S. G. EDWARDS     2,788,595

PERPETUAL CALENDAR DEVICE

Filed Nov. 30, 1955     3 Sheets-Sheet 2

PERPETUAL CALENDAR

| GREGORIAN CALENDAR 19th CENTURY YEARS | | | | CALENDAR LETTERS | | | GREGORIAN CALENDAR 20th CENTURY YEARS | | | |
|---|---|---|---|---|---|---|---|---|---|---|
| | | | | TU WE TH FR SA SU MO | C | TU WE TH FR SA SU MO | 1901 | 1929 | 1957 | 1985 |
| | | | | WE TH FR SA SU MO TU | D | WE TH FR SA SU MO TU | 1902 | 1930 | 1958 | 1986 |
| 1801 | 1829 | 1857 | 1885 | TH FR SA SU MO TU WE | E | TH FR SA SU MO TU WE | 1903 | 1931 | 1959 | 1987 |
| 1802 | 1830 | 1858 | 1886 | FR SA SU MO TU WE TH | F | FR SA SU MO TU WE TH | 1904 | 1932 | 1960 | 1988 |
| 1803 | 1831 | 1859 | 1887 | SA SU MO TU WE TH FR | G | SA SU MO TU WE TH FR | 1904 | 1932 | 1960 | 1988 |
| 1804 | 1832 | 1860 | 1888 | SU MO TU WE TH FR SA | A | SU MO TU WE TH FR SA | 1905 | 1933 | 1961 | 1989 |
| 1804 | 1832 | 1860 | 1888 | MO TU WE TH FR SA SU | B | MO TU WE TH FR SA SU | 1906 | 1934 | 1962 | 1990 |
| 1805 | 1833 | 1861 | 1889 | TU WE TH FR SA SU MO | C | TU WE TH FR SA SU MO | 1907 | 1935 | 1963 | 1991 |
| 1806 | 1834 | 1862 | 1890 | WE TH FR SA SU MO TU | D | WE TH FR SA SU MO TU | 1908 | 1936 | 1964 | 1992 |
| 1807 | 1835 | 1863 | 1891 | TH FR SA SU MO TU WE | E | TH FR SA SU MO TU WE | 1908 | 1936 | 1964 | 1992 |
| 1808 | 1836 | 1864 | 1892 | FR SA SU MO TU WE TH | F | FR SA SU MO TU WE TH | 1909 | 1937 | 1965 | 1993 |
| 1808 | 1836 | 1864 | 1892 | SA SU MO TU WE TH FR | G | SA SU MO TU WE TH FR | 1910 | 1938 | 1966 | 1994 |
| 1809 | 1837 | 1865 | 1893 | SU MO TU WE TH FR SA | A | SU MO TU WE TH FR SA | 1911 | 1939 | 1967 | 1995 |
| 1810 | 1838 | 1866 | 1894 | MO TU WE TH FR SA SU | B | MO TU WE TH FR SA SU | 1912 | 1940 | 1968 | 1996 |
| 1811 | 1839 | 1867 | 1895 | TU WE TH FR SA SU MO | C | TU WE TH FR SA SU MO | 1912 | 1940 | 1968 | 1996 |
| 1812 | 1840 | 1868 | 1896 | WE TH FR SA SU MO TU | D | WE TH FR SA SU MO TU | 1913 | 1941 | 1969 | 1997 |
| 1812 | 1840 | 1868 | 1896 | TH FR SA SU MO TU WE | E | TH FR SA SU MO TU WE | 1914 | 1942 | 1970 | 1998 |
| 1813 | 1841 | 1869 | 1897 | FR SA SU MO TU WE TH | F | FR SA SU MO TU WE TH | 1915 | 1943 | 1971 | 1999 |
| 1814 | 1842 | 1870 | 1898 | SA SU MO TU WE TH FR | G | SA SU MO TU WE TH FR | 1916 | 1944 | 1972 | 2000 |
| 1815 | 1843 | 1871 | 1899 | SU MO TU WE TH FR SA | A | SU MO TU WE TH FR SA | 1916 | 1944 | 1972 | 2000 |
| 1816 | 1844 | 1872 | 1900 | MO TU WE TH FR SA SU | B | MO TU WE TH FR SA SU | 1917 | 1945 | 1973 | |
| 1816 | 1844 | 1872 | | TU WE TH FR SA SU MO | C | TU WE TH FR SA SU MO | 1918 | 1946 | 1974 | |
| 1817 | 1845 | 1873 | | WE TH FR SA SU MO TU | D | WE TH FR SA SU MO TU | 1919 | 1947 | 1975 | |
| 1818 | 1846 | 1874 | | TH FR SA SU MO TU WE | E | TH FR SA SU MO TU WE | 1920 | 1948 | 1976 | |
| 1819 | 1847 | 1875 | | FR SA SU MO TU WE TH | F | FR SA SU MO TU WE TH | 1920 | 1948 | 1976 | |
| 1820 | 1848 | 1876 | | SA SU MO TU WE TH FR | G | SA SU MO TU WE TH FR | 1921 | 1949 | 1977 | |
| 1820 | 1848 | 1876 | | SU MO TU WE TH FR SA | A | SU MO TU WE TH FR SA | 1922 | 1950 | 1978 | |
| 1821 | 1849 | 1877 | | MO TU WE TH FR SA SU | B | MO TU WE TH FR SA SU | 1923 | 1951 | 1979 | |
| 1822 | 1850 | 1878 | | TU WE TH FR SA SU MO | C | TU WE TH FR SA SU MO | 1924 | 1952 | 1980 | |
| 1823 | 1851 | 1879 | | WE TH FR SA SU MO TU | D | WE TH FR SA SU MO TU | 1924 | 1952 | 1980 | |
| 1824 | 1852 | 1880 | | TH FR SA SU MO TU WE | E | TH FR SA SU MO TU WE | 1925 | 1953 | 1981 | |
| 1824 | 1852 | 1880 | | FR SA SU MO TU WE TH | F | FR SA SU MO TU WE TH | 1926 | 1954 | 1982 | |
| 1825 | 1853 | 1881 | | SA SU MO TU WE TH FR | G | SA SU MO TU WE TH FR | 1927 | 1955 | 1983 | |
| 1826 | 1854 | 1882 | | SU MO TU WE TH FR SA | A | SU MO TU WE TH FR SA | 1928 | 1956 | 1984 | |
| 1827 | 1855 | 1883 | | MO TU WE TH FR SA SU | B | MO TU WE TH FR SA SU | 1928 | 1956 | 1984 | |
| 1828 | 1856 | 1884 | | TU WE TH FR SA SU MO | C | TU WE TH FR SA SU MO | 1901 | 1929 | 1957 | 1985 |
| 1828 | 1856 | 1884 | | WE TH FR SA SU MO TU | D | WE TH FR SA SU MO TU | 1902 | 1930 | 1958 | 1986 |

FIG. 3

INVENTOR.
SIDNEY G. EDWARDS

BY Andros and Smith

ATTORNEYS

April 16, 1957     S. G. EDWARDS     2,788,595
PERPETUAL CALENDAR DEVICE

Filed Nov. 30, 1955     3 Sheets-Sheet 3

KEY FOR CALENDAR LETTERS

| | JULIAN CALENDAR | | | | | | |
|---|---|---|---|---|---|---|---|
| From | 1201 | 1301 | 1401 | 1501 | 1601 | 1701 | 1801 |
| To | 1300 | 1400 | 1500 | 1600 | 1700 | 1800 | 1900 |
| | GREGORIAN CALENDAR | | | | | | |
| From | 1601 | | 1701 | | 1801 | | 1901 |
| To | 1700 | | 1800 | | 1900 | | 2000 |

| YEARS OF CENTURIES | See Note at bottom of this page | | | | | | |
|---|---|---|---|---|---|---|---|
| 1 29 57 85 | B | A | G | F | E | D | C |
| 2 30 58 86 | C | B | A | G | F | E | D |
| 3 31 59 87 | D | C | B | A | G | F | E |
| 4 32 60 88 | E F | D E | C D | B C | A B | G A | F G |
| 5 33 61 89 | G | F | E | D | C | B | A |
| 6 34 62 90 | A | G | F | E | D | C | B |
| 7 35 63 91 | B | A | G | F | E | D | C |
| 8 36 64 92 | C D | B C | A B | G A | F G | E F | D E |
| 9 37 65 93 | E | D | C | B | A | G | F |
| 10 38 66 94 | F | E | D | C | B | A | G |
| 11 39 67 95 | G | F | E | D | C | B | A |
| 12 40 68 96 | A B | G A | F G | E F | D E | C D | B C |
| 13 41 69 97 | C | B | A | G | F | E | D |
| 14 42 70 98 | D | C | B | A | G | F | E |
| 15 43 71 99 | E | D | C | B | A | G | F |
| 16 44 72 100 | F G | E F | D E | C D | B C | A B | G A |
| 17 45 73 | A | G | F | E | D | C | B |
| 18 46 74 | B | A | G | F | E | D | C |
| 19 47 75 | C | B | A | G | F | E | D |
| 20 48 76 | D E | C D | B C | A B | G A | F G | E F |
| 21 49 77 | F | E | D | C | B | A | G |
| 22 50 78 | G | F | E | D | C | B | A |
| 23 51 79 | A | G | F | E | D | C | B |
| 24 52 80 | B C | A B | G A | F G | E F | D E | C D |
| 25 53 81 | D | C | B | A | G | F | E |
| 26 54 82 | E | D | C | B | A | G | F |
| 27 55 83 | F | E | D | C | B | A | G |
| 28 56 84 | G A | F G | E F | D E | C D | B C | A B |
| See Note. | F | | D | | B | | |

Note:- Years for which two Calendar Letters are shown are Leap Years, and first letter is for dates through February 29 and the second for the balance of the year. Other years are Common Years and February 29 is disregarded. Calendar Letters in Bottom line of table above are for the years 1700, 1800 and 1900 of Gregorian Calendar as they are not Leap Years.

*FIG. 4*

INVENTOR.
SIDNEY G. EDWARDS
BY *Andros and Smith*
ATTORNEYS

United States Patent Office 2,788,595
Patented Apr. 16, 1957

2,788,595
PERPETUAL CALENDAR DEVICE
Sidney G. Edwards, Albany, N. Y.

Application November 30, 1955, Serial No. 550,006

3 Claims. (Cl. 40—107)

This invention relates to improvements in perpetual calendars, and its principal object is to provide a simply constructed, readily understandable, and easily readable calendar by means of which, and with a minimum number of operations either mental or mechanical any date falling under either the Julian (old style) or Gregorian (new style) calendar can be quickly ascertained and the calendar for the full year in which the date occurs will be completely displayed in standard form.

The present invention combines in a single instrument using a common key and a common calendar sheet for both the Julian and Gregorian calendars, mechanically applying them by means of said key and calendar sheet to periods of years in which each calendar repeats itself, the key and calendar sheet being so arranged with regard to the characteristics of the two calendar systems as to reduce to a minimum the instructions required to be followed in the use of the calendar. The calendar sheet is constructed to display a full year of either the Julian or Gregorian system.

Other and further objects and advantages of the device will be clear from the following specification, taken with the accompanying drawings in which like characters of reference refer to like parts in the several views, and in which:

Fig. 3 is a development of the surface markings on the cylindrical element seen in the section of Fig. 2; and Fig. 4 is the key chart to be used in conjunction with the device of Fig. 1 to extend the use of the calendar back to the year 1201.

Figure 1:
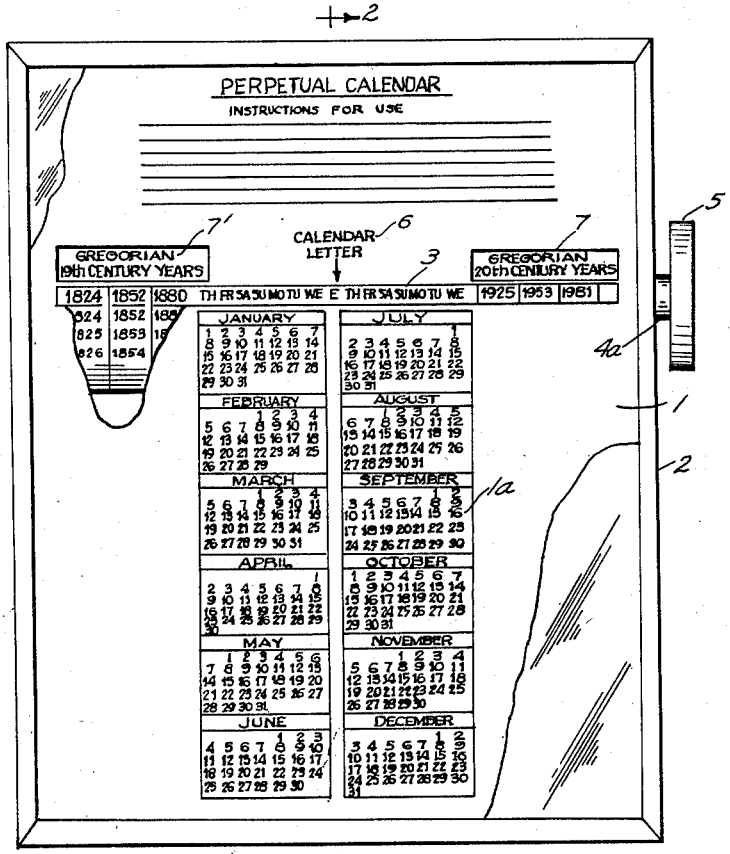
Fig. 1 is a front elevation, partly broken away, showing the perpetual calendar of the present invention.

In the embodiment shown in Fig. 1 a calendar sheet, 1, is mounted in a suitable frame, 2, to be visible to the operator. This calendar sheet includes a complete calendar 1a, for one year starting with January in the upper left hand column and with July in the upper right hand column, the date numbers being arranged in horizontal lines, each line representing a week in the manner usual with calendars. At the transition from month to month the date numerals are spaced downwardly and the month heading is inserted at the head of each month. It will be noted that the first of January in this chart is placed in the upper left hand corner of the left hand column which brings the 31st of January in the third column from the left, and therefore the first of February is in the fourth column from the left. The first of each month, it will be noted, is placed in the column next to the right from the day of the last date of the preceding month. The first of March therefore is placed in the fourth column from the left because the 28th of February falls in the third column from the left. In order to provide for leap years, however, a number 29 is provided at the end of February. It will be noted that in any year in which the first of January falls on a Sunday the heading for the calendar for the entire year will be as it is in the conventional yearly calendar where Sunday is the heading for the left hand column and the days of the week read from Sunday to Saturday in the seventh column.

Just above the calendar on the calendar sheet in Fig. 1 is an opening 3, extending across the top of the calendar and a substantial distance to each side. A drum 4, is mounted behind the opening 3, on a horizontal axis 4a, which extends through the frame 2, and which may be rotated by a knob 5, seen in Fig. 1. On the surface of this drum is a table 6, a development of which is shown in Fig. 3. The drum with its encircling table is mounted so that only one line of the printed table is visible through the opening 3 at one time. This line of printing, visible through aperture 3, is made up of several columns. The columns immediately over the calendar list days of the week, to form a heading for each column of the calendar. Between the two columns of the calendar there appears a letter which is designated as a "calendar letter" by a legend 6, thereabove. It will be noted in Fig. 1 that the calendar letter is E and that the first of January falls Thursday. This condition obtained in the years 1925, 1953 and will obtain in the year 1981 as indicated in the columns to the right of the calendar chart under the permanent heads 7, reading "Gregorian Calendar, 20th Century Years." By laying a straight edge across Fig. 3 in a horizontal line including the year 1950, it will be noticed that the first of January falls on a Sunday in that year and the calendar letter is A. From Fig. 3 it further appears by moving the straight edge down one line that in the year 1951 when January first falls on Monday, the calendar letter is B. So it will be noticed that starting with A for each succeeding calendar letter the day of the week headings move one column to the left so when the calendar letter is B, the week starts with a Monday, C with a Tuesday, D with Wednesday, etc. Referring again to the showing in Fig. 1, it will be noticed that while the years 1925, 1953 and 1981 call for the heading at the top of the calendar chart to read the same through the entire year, as these years are not leap years. The years in the 19th century corresponding to these years, that is 1824, 1852 and 1880, seen in the columns to the left of the calendar chart under heading 7 "Gregorian Calendar 19th Century Years," are leap years, and for this reason the calendar letter E applies only through the 29th of February, after which the drum 4 must be turned to the next line, which lists the same years but shows a calendar letter F for the remainder of the year. Leap years such as 1928, 1956, and 1984 are treated in like manner and the calendar number changes from A to B after February 29th of these years.

Figure 2:
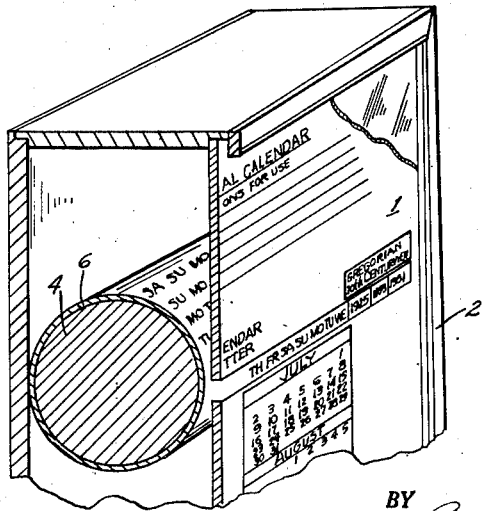
Fig. 2 is a perspective view partly in section of the device of Fig. 1.

The device as shown in Figs. 1, 2, and 3 is complete for the years 1800 through the year 2,000 for the Gregorian calendar. By the use of the chart shown in Fig. 4, the use of this device may be extended to cover the entire Christian era. The use of the device could also be extended by providing data for additional centuries to the table on the drum 4. The chart of Fig. 4 may be printed on the face of the calendar sheet above opening 3, or elsewhere.

In both the Julian and Gregorian calendars each fourth year is leap year except that in the Gregorian calendar the last year of any century (such as 1900) is not a leap year unless divisible by 400. This makes the Gregorian calendar three days shorter than the Julian calendar in every 400 years. This fact explains the chart or table of Fig. 4 which extends from the year 1201 through the year 1900 of the Julian calendar and years 1601 through 2000 of the Gregorian calendar. This chart could also be further extended in either direction but such extension is not necessary because the Gregorian calendar repeats itself every 400 years and in a similar manner the Julian calendar repeats itself every 700 years. The Gregorian calendar also is based on a 28 year cycle. This 28 year cycle is made use of in Figs. 3 and 4 where the years are listed in groups of 28 years.

It will be noted in Fig. 4 that each of the years of each century which is a leap year has listed opposite it two calendar letters. The first of which is to be used for the first two months and the second to be used for the remainder of the calendar year. The reason that the leap year day, inserted at the end of February requires the use of two calendar letters in the device of this invention, is that sometime during the 18th century New Year's day was changed from the 25th of March to the first of January as evidenced by the Latin derivation of the names of the months from September through December indicating them to be the seventh, eighth, ninth, and tenth month, making February the twelfth month to which the leap year day had previously been added.

In order to determine the dates for any of the centuries of either the Julian calendar or the Gregorian calendar beyond the two centuries covered by the printed table mounted on drum 4, it is necessary first to determine the calendar letter for the years in question by reference to Fig. 4. The rotatable drum is then adjusted so that the appropriate calendar letter appears in the opening 3 taking due account of the need of two such calendar letters in the case of leap years. When the appropriate calendar letter is shown in opening 3, the day of the week headings at the top of the calendar chart will be correct for that year, or part year in case of leap years.

To extend the chart or key of Fig. 4 for use to determine the calendar for a year previous to 1201 (it would be the Julian calendar that was in use at that time) it is merely necessary to find in which column the desired century falls. For instance the calendar for the year 1066 can be found by counting back two columns from the right hand side of the key, since the calendar repeating every 700 years the calendar for the century 1101–1200 must be the same as for the century 1801–1900 as each falls in the same relative position in a 700 year repeating cycle. So the century 1001–1100 would be the same as for the century 1701–1800 and the calendar letter for 1066 is A. If the knob 5 in the calendar of Fig. 1 is turned until A (any A) appears as the calendar letter, the complete calendar for the year 1066 is displayed.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A perpetual calendar comprising a calendar sheet, a calendar for a complete year on said sheet arranged in two vertical columns of months and horizontal lines of weeks, the days of the week reading from left to right, a straight line opening only in said calendar sheet at the head of said vertical columns of months, said opening being horizontally disposed and extending laterally and normally of each vertical column, a rotatable drum mounted behind said opening, a table of week days consecutively arranged in horizontal lines as well as in vertical consecutive lines, and positioned so that successive horizontal lines appear directly above said columns of months as said drum is rotated transversely of said opening, a table of years arranged in horizontal and in vertical consecutive lines, one horizontal line of which is visible at a time through said lateral opening, said table of years being associated with said table of week days on said drum and so arranged with respect to said table of week days, that upon locating the desired year to be visible through said opening by rotation of said drum, the table of week days will be in coaxial alignment with said years and said opening and so positioned with respect to said opening as to display the correct week day headings for said calendar year.

2. The perpetual calendar of claim 1 in which an identifying calendar letter is associated with each horizontal line of the table of week days in a repeating seven letter series A through G, consecutively, and in a single vertical line each letter being associated with a specific horizontal line at its every recurrence, and a key chart for determination of the calendar letter or letters for any year, whereby the calendar may be used for any year of the Christian era.

3. A perpetual calendar including a calendar formed in two columns of six months each, the left hand column headed by January and the right hand column headed by July, the date numbers being arranged in horizontal lines reading from left to right, each line representing a week starting with the first of January at the left hand side of the column, the horizontal lines of date numbers ending at the date of the end of each month and commencing the next moth in the vertical column next to the right and spaced downwardly a sufficient distance to provide for the next month heading, except that the first of March falls in the same vertical column as the 29th of February, a straight line opening only across the top of said calendar chart, a drum carrying printed indicia arranged behind and parallel to said opening so that a single horizontal line of the printed indicia on said drum is visible only through said opening, said drum including at least thirty-five such lines to provide one line for each common year of the twenty-eight year cycle of the calendar and two lines for each leap year in the cycle, indicia on said drum arranged to selectively appear at said opening immediately above said calendar comprising day of the week headings, and indicia on said drum appearing in said opening to one side of the calendar to identify by years the position in which to adjust said drum, whereby the correct week day headings appear above said calendar.

References Cited in the file of this patent
UNITED STATES PATENTS

| | | |
|---|---|---|
| 301,553 | Bereman | July 8, 1884 |
| 337,478 | Carey | Mar. 9, 1886 |
| 1,345,150 | Edwards | June 29, 1920 |
| 1,661,288 | Hillyard | Mar. 6, 1928 |